Dec. 6, 1932. S. S. JOHNSON 1,889,805
METER PROTECTOR
Filed Oct. 27, 1930 2 Sheets-Sheet 1
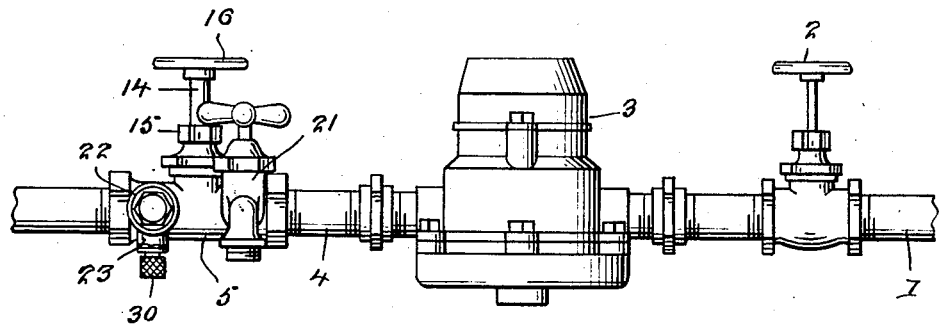

Dec. 6, 1932.  S. S. JOHNSON  1,889,805
METER PROTECTOR
Filed Oct. 27, 1930  2 Sheets-Sheet 2
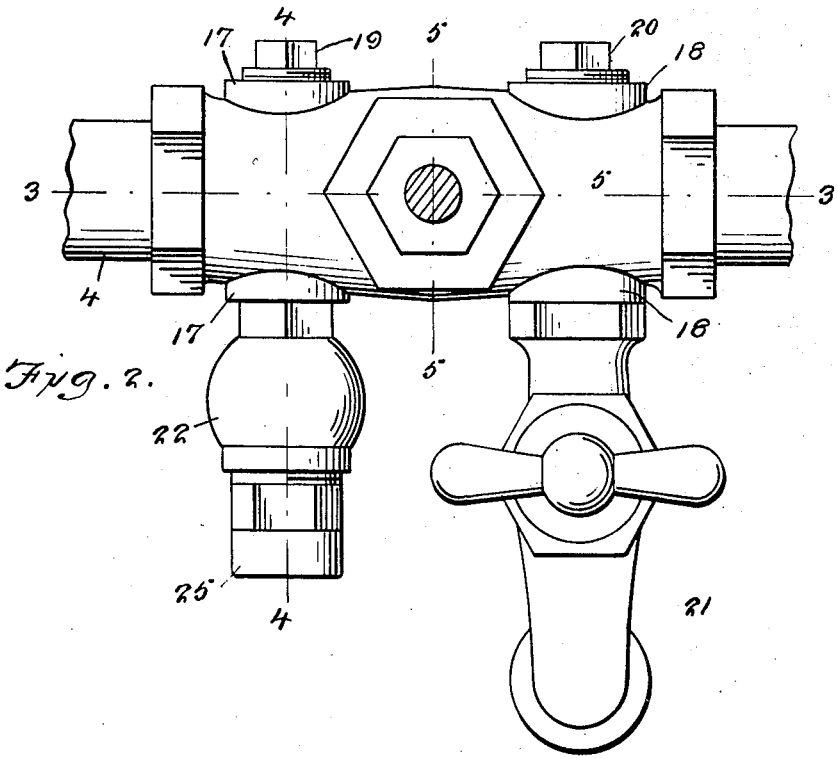
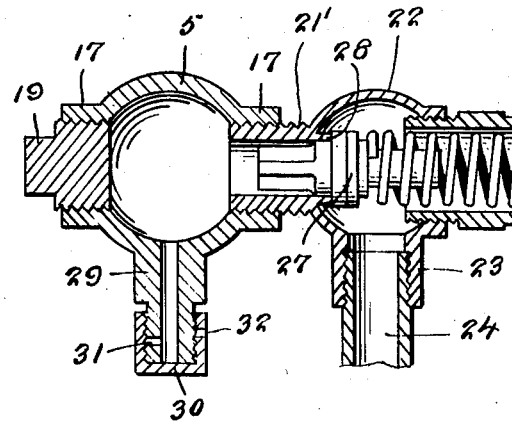
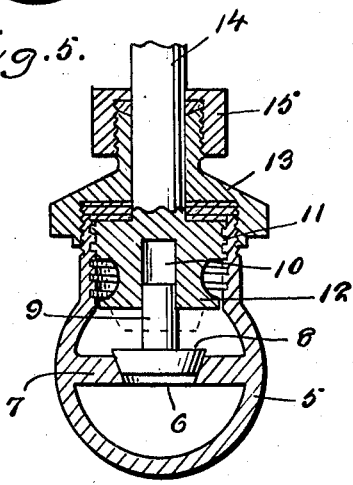
S. S. Johnson
INVENTOR
BY Victor J. Evans
ATTORNEY Patented Dec. 6, 1932

1,889,805

UNITED STATES PATENT OFFICE

SAMUEL S. JOHNSON, OF HARRISBURG, PENNSYLVANIA

METER PROTECTOR

Application filed October 27, 1930. Serial No. 491,545.

My present invention has reference to a protector for water meters in house systems.

Among the objects of the invention is the provision of a fitting that is coupled in the pipe leading from the meter to the house supply and which embodies means for protecting the meter from back pressure of hot water through the system, means to permit of the testing of the meter, means for rendering the system safe and means for draining the system when occasion requires.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 1 is a side elevation of the improvement in applied position.

Figure 2 is a top plan view thereof.

Figure 3 is a sectional view approximately on the line 3—3 of Figure 2.

Figure 4 is a sectional view approximately on the line 4—4 of Figure 2.

Figure 5 is a sectional view approximately on the line 5—5 of Figure 2.

In Figure 1 of the drawings the pipe connected to the water main is indicated by the numeral 1, and the flow of water through this pipe is controlled by a hand operated valve 2. The pipe 1 is connected to the inlet end of an ordinary construction of water meters which is indicated by the numeral 3 and the outlet pipe from the meter to the house system is indicated by the character 4. The pipe 4, of course, comprises sections and screwed in the confronting ends of these sections there is the body casting 5 of the improvement. The body is hollow and is provided with a horizontally disposed valve seat 6 provided by a flared opening in a horizontal partition 7, the said horizontal partition being connected to the top and to the bottom of the body 5 by the usual flanges. Normally occupying the seat 6 there is a gravity influenced check valve 8 that is provided with a stem 9 which is received in a recess or pocket 10 in the threaded end 11 of a valve head 12. The threaded end of the valve head is screwed in an upstanding extension in the body 5 and this extension has screwed thereon the bonnet 13 through which passes the stem 14 for the valve head 12. The bonnet has screwed thereon the usual packing nut 15 and the stem 14 is provided with the usual operating handle 16.

At the opposite sides of the valve seat the body 5 is formed with outstanding cylindrical and interiorly threaded pairs of alining lugs or bosses 17—17 and 18—18, respectively. Two of the bosses are closed by screw plugs 19 and 20 and in the remaining boss 18, nearest the meter there is screwed an ordinary spigot 21. In the second boss 17 there is screwed the threaded end 21' of a hollow globular casting 22, the said casting being formed with a depending branch 23 in which is screwed a water outlet pipe 24. The outer end of the globular member 22 is hollow and interiorly threaded and has screwed therein a hollow cap member 25 in which is seated a coil spring 26 that exerts a pressure against a sliding valve 27 to force the same against a seat 28 in the said member 22. The body 5 is provided with a drain outlet that is surrounded by a depending boss 29 and the said boss being arranged between the bosses 17—17 and on the end of the said boss 29 there is screwed a hollow cap member 30.

The boss 29 is provided with a transverse aperture 31 and the cap 30 is provided with a like aperture 32. These apertures are normally out of alinement but when the cap is partly unscrewed from the boss the aperture 32 is brought into alinement with the aperture 31 which permits of the house system being drained.

With my improvement the meter 3 is fully protected so that the same will not get out of working order. Upon a back pressure of hot water from the house system the check valve 8 will be forced on its seat 6, thereby stopping the flow of water from the main and through the meter to the body 5. This will prevent the warping of the rubber discs in the meter which renders the working of the meter unreliable. Added pressure of water from the house system will unseat the safety valve 27, causing the water to flow through the pipe 24 to a sewer or the like. As stated, the system may be drained by adjusting the cap 30 to bring the ports 32 and 31 into alinement.

When it is desired to test the meter the valve 2 is closed whereby the check valve 8 falls against its seat. The top of the meter is then opened for inspection. A measuring container is placed under the spigot 21, and the latter is opened to draw water therefrom. The spigot is then closed and if the meter registers the same amount as the quantity of water drawn off the inspector has knowledge that the meter is in perfect working order.

It is to be noted that my improved meter protector does away with all fittings and that by providing the same with the oppositely directed alining bosses 17—17 and 18—18 the spigot 21 and the casting 22 for the safety valve may be screwed in either side of the body 5, so that these elements may be arranged inwardly of the cellar in which the system is installed, regardless of the fact that the meter may be arranged upon either the right or left hand side of the cellar wall and it is thought that the foregoing description will fully and clearly set forth the construction and advantages of the improvement to those skilled in the art to which such invention relates.

Having described the invention, I claim:

A protector for water meters, comprising a body casting divided by a valve seat into an inner and an outer compartment, the inner compartment being connected to the meter and the outer compartment being connected to the house water supply pipe, a gravity-influenced check valve normally occupying the seat, a handle-operated head screwed in the body and having a hollow portion to receive the stem of the check valve therein, said body having its compartments provided with opposite openings surrounded by bosses, plugs covering two of said openings, a faucet screwed in the remaining opening of the inner compartment, a globular valve casing screwed in the remaining opening of the outer compartment, said casing having a water outlet branch, a spring-urged valve for closing said branch, the outer compartment being provided with a depending hollow boss which is exteriorly threaded and provided with a transverse aperture and a cap screwed on the stem and having a transverse aperture normally out of alignment with the aperture in the boss.

In testimony whereof I affix my signature.

SAMUEL S. JOHNSON.